(12) United States Patent
Shin et al.

(10) Patent No.: US 9,832,720 B2
(45) Date of Patent: Nov. 28, 2017

(54) SYSTEM AND METHOD FOR SELECTING WIRELESS RESOURCE

(71) Applicant: Electronics and Telecommunications Research Institute, Daejeon (KR)

(72) Inventors: Dong Jin Shin, Daejeon (KR); Seung-Hwan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 44 days.

(21) Appl. No.: 14/735,325

(22) Filed: Jun. 10, 2015

(65) Prior Publication Data

US 2016/0113024 A1    Apr. 21, 2016

(30) Foreign Application Priority Data

Oct. 20, 2014   (KR) .................. 10-2014-0142051

(51) Int. Cl.
*H04W 72/08*   (2009.01)
*H04W 48/20*   (2009.01)
*H04W 72/02*   (2009.01)

(52) U.S. Cl.
CPC .......... *H04W 48/20* (2013.01); *H04W 72/087* (2013.01)

(58) Field of Classification Search
CPC ............................ H04W 48/20; H04W 72/087

USPC ................................................. 455/436–444
See application file for complete search history.

(56) References Cited

U.S. PATENT DOCUMENTS

| 8,351,344 | B2  | 1/2013 | Jung et al. |
| 2013/0225193 | A1 | 8/2013 | Lee et al. |
| 2013/0231150 | A1 | 9/2013 | Bang et al. |
| 2014/0229210 | A1* | 8/2014 | Sharifian ............ G06Q 30/0201 705/7.12 |
| 2015/0087307 | A1* | 3/2015 | Cui ........................ H04W 48/20 455/436 |

FOREIGN PATENT DOCUMENTS

| KR | 1020130085812 A | 7/2013 |
| KR | 1020130086559 A | 8/2013 |
| KR | 1020130090669 A | 8/2013 |

* cited by examiner

*Primary Examiner* — Erica Navar
(74) *Attorney, Agent, or Firm* — William Park & Associates Ltd.

(57) ABSTRACT

A system for selecting a wireless resource that is interworked with a terminal and one or more base stations selects a base station for the terminal based on received subjective quality of experience and pre-stored quality reference information and transmits information on the selected base station as wireless resource information to the terminal, when the system receives quality of service (QoS) information, which is objective quality information, of a wireless section and terminal information from the terminal, in order to select any one base station.

6 Claims, 5 Drawing Sheets

SYSTEM AND METHOD FOR SELECTING WIRELESS RESOURCE

CROSS-REFERENCE TO RELATED APPLICATION

This application claims priority to and the benefit of Korean Patent Application No. 10-2014-0142051 filed in the Korean Intellectual Property Office on Oct. 20, 2014, the entire contents of which are incorporated herein by reference.

BACKGROUND OF THE INVENTION (a) Field of the Invention

The present invention relates to a system and a method for selecting a wireless resource.

(b) Description of the Related Art

Recently, as a combination of Internet technology with wireless communication networks has accelerated and popularization of smartphones has been generalized, traffic characteristics that are voice-centered have changed to data-centered characteristics Therefore, data traffic has been explosively increased according to video data downloading, social network service (SNS), web accesses, and the like.

On the other hand, in terms of revenues of service providers, a profit margin of the service provider is not proportional to the explosion of traffic, which causes only an increase in network investment costs. Therefore, a proper charging structure capable of effectively realizing an increase in user costs according to traffic usage and satisfying quality of experience according to service grades of the user has been considered.

A background capable of realizing the above-mentioned effective charging structure depends on a non-linear relationship of characteristics in which objective quality of service (QoS) and subjective quality of experience (QoE) that is experienced by a user are not proportional to each other, and the subjective quality of experience (QoE) that is experienced by the user is not increased any more even though the object QoS is increased at a certain level or more.

Therefore, a method and a system capable of efficiently allocating network resources and radio resources utilizing nonlinearity between the object QoS and the subjective QoE and selecting various radio access technologies (RATs), that is, a base station satisfying an optimal subjective QoE of the user among base stations, are required. However, since a method for allocating a network and a wireless resource thus far allocates the resource and selects the radio access technology based on an objective quality reference, it is inefficient and the wireless resource is redundantly allocated, and the radio access technology (base station) is also not effective.

In addition, even in a fifth generation wireless communication network after a fourth generation wireless communication network accommodating various heterogeneous radio access technologies, a method for increasing the subjective quality of experience that is experienced by the user by preventing traffic from being concentrated on a specific radio access apparatus having excellent objective quality reference and effectively dispersing the traffic has been required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and a method for selecting a wireless resource by subjective quality information of a user.

An exemplary embodiment of the present invention provides a system for selecting a wireless resource that is interworked with a terminal and one or more base stations, including:

a manager storing and managing base station information in order to manage one or more base stations that are interworked; a quality reference storage storing quality reference information; a quality data storage receiving quality of service (QoS) information, which is objective quality information of a wireless section and subjective quality of experience generated based on terminal information from the terminal and transmitting the received subjective quality of experience to one or more base stations; and a base station selector selecting a base station to be interworked with the terminal based on the subjective quality of experience received by the quality data storage and the quality reference information stored in the quality reference storage and transmitting wireless resource information on the selected base station.

The quality reference information may include at least one piece of information of a grade of a user, service type, and a grade for each service type, and a base station matched to a quality reference of a service required by the terminal or may be used as reference information for allocating the wireless resource within the base station may be selected.

The terminal may include a QoS collector receiving the quality of service (QoS) information, which is the objective quality information of the wireless section, from a plurality of base stations and collecting the terminal information; a QoE converter generating the subjective quality of experience based on the QoS information received by the QoS collector and the terminal information; a wireless resource information receiver receiving the wireless resource information on the base station selected by the base station selector; and an interworking processor interworking with the selected base station based on the wireless resource information received by the wireless resource information receiver.

Another embodiment of the present invention provides a method for selecting any one of one or more base stations by a system for selecting a wireless resource that is interworked with a terminal and one or more base stations, including:

receiving quality of service (QoS) information, which is objective quality information of a wireless section, and subjective quality of experience generated based on terminal information from the terminal; selecting a base station for the terminal based on the received subjective quality of experience and pre-stored quality reference information; and transmitting information for the selected base station as the wireless resource information to the terminal.

The receiving of the subjective quality of experience may include: storing the received subjective quality of experience; and transmitting the received subjective quality of experience to one or more base stations.

The transmitting of the wireless resource information to the terminal may include transmitting the quality reference information to the selected base station so as to be used as reference information together with the subjective quality of experience when the wireless resource for the terminal is allocated.

The method may further include: before the receiving of the subjective quality of experience, receiving, by the terminal, the QoS information, which is the objective quality information from one or more base stations; collecting, by the terminal, the terminal information; and generating the subjective quality of experience using the received QoS information and the terminal information.

According to an embodiment of the present invention, since the subjective quality information is stored in and distributed to the devices in the wireless network and the subjective quality of experience of the user is optimally satisfied using the subjective quality information, unnecessary wastage of the wireless resource may be reduced and costs of a network provider may be reduced by the optimal resource selection and allocation. In addition, the subjective quality of experience that is experienced by the user may be satisfied.

DETAILED DESCRIPTION OF THE EMBODIMENTS

Figure 1:
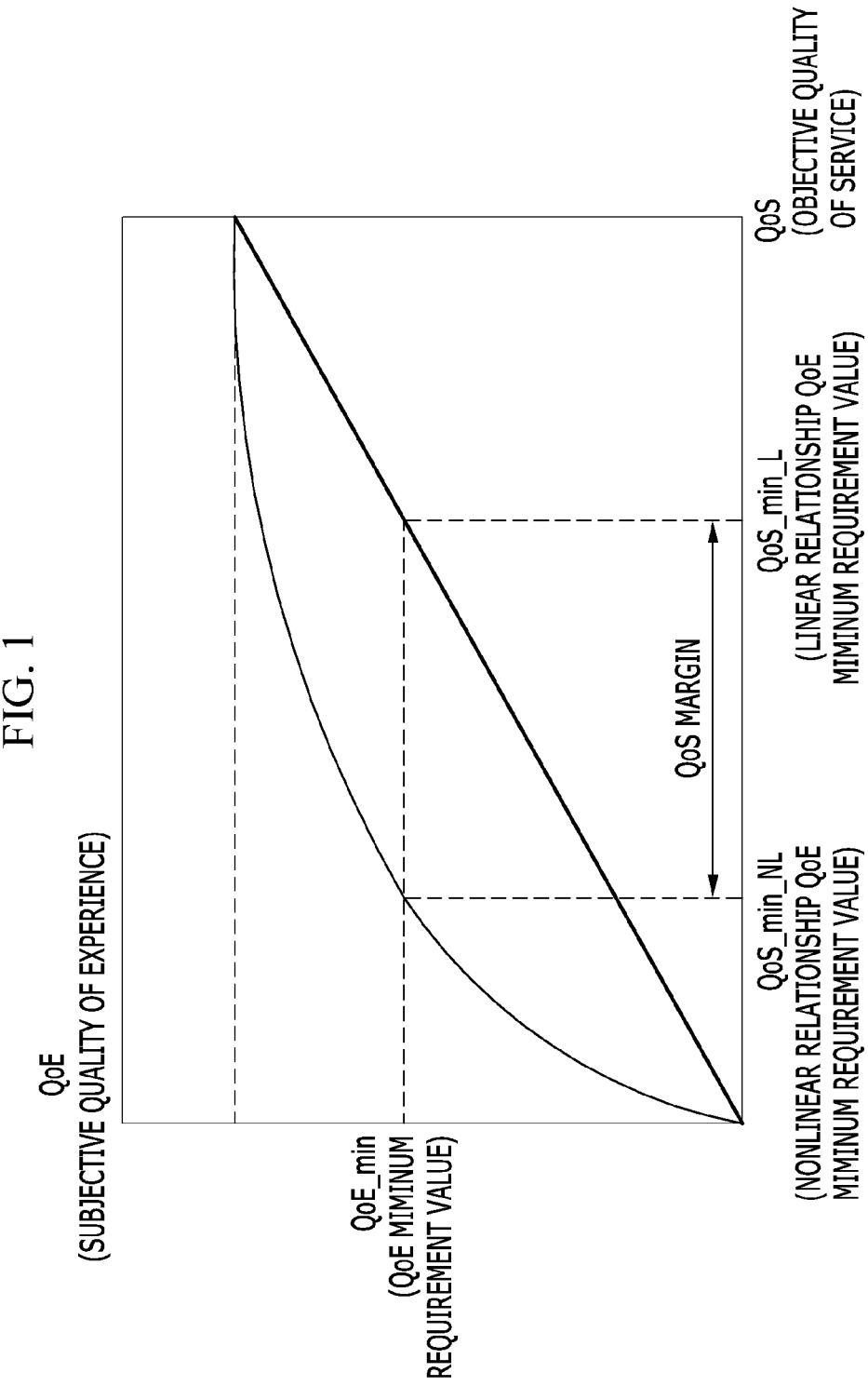
FIG. 1 is an illustrative diagram showing a relationship between objective quality of service and subjective quality of experience.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the present specification, a terminal may be referred to as a mobile station (MS), a mobile terminal (MT), a subscriber station (SS), a portable subscriber station (PSS), a user equipment (UE), an access terminal (AT), or the like, and may include all or some of functions of the mobile terminal, the subscriber station, the portable subscriber station, the user equipment, and the like.

In the present specification, a base station (BS) may be referred to as an access point (AP), a radio access station (RAS), a NodeB, a base transceiver station (BTS), a mobile multihop relay (MMR)-BS, or the like, and may include all or some of functions of the access point, the radio access station, the NodeB, the base transceiver station, the MMR-BS, and the like.

Hereinafter, a system and a method for selecting a wireless resource by subjective quality information of a user will be described with reference to the accompanying drawings. Prior to describe an exemplary embodiment of the present invention, a relationship between objective quality of service (QoS) and subjective quality of experience (QoE) will be first described with reference to FIG. 1.

FIG. 1 is an illustrative diagram showing a relationship between objective quality of service and subjective quality of experience.

Based on a fact that the QoE, which is the subjective quality of experience that is experienced by a user, is not linearly proportional to the QoS, which is an objective quality of a wireless network, a system and a method for performing a function of collecting subjective quality information (a function of collecting objective quality information and converting it into a subjective quality reference), a function of transferring quality information of the wireless network to a database, an optimal radio access technology by an integration control server using the quality information, that is, a function of selecting a base station, and a function of allocating the wireless resource in the base station are proposed.

As illustrated in FIG. 1, the objective quality of service and the subjective quality that is experienced by the user generally have a nonlinear relationship rather than a linear relationship for voice, image, and data services in wireless communication. There is room for improving efficiency in selecting and allocating the resource using the above-mentioned characteristics.

As illustrated in FIG. 1, if a subjective quality reference required by a mobile service user is a QoE minimum requirement value (QoE_min) or more, the QoS needs to have a quality reference value of a QoS_minNL value or more which is the QoS minimum requirement value in the linear relationship, which is a control reference according to an existing objective quality of service. On the other hand, the QoS minimum requirement value has a QoS_min_NL value in the nonlinear relationship according to the subjective quality reference of the user which practically has the nonlinear relationship, and consequently, obtains a QoS margin as much as (QoS_min_L−QoS_min_NL). Therefore, even in the case in which the objective quality reference is decreased as much as the QoS margin, the user experiences the same level of quality.

An environment in which the base station is selected and the wireless resource is allocated using the subjective quality information will be described with reference to FIG. 2.

Figure 2:
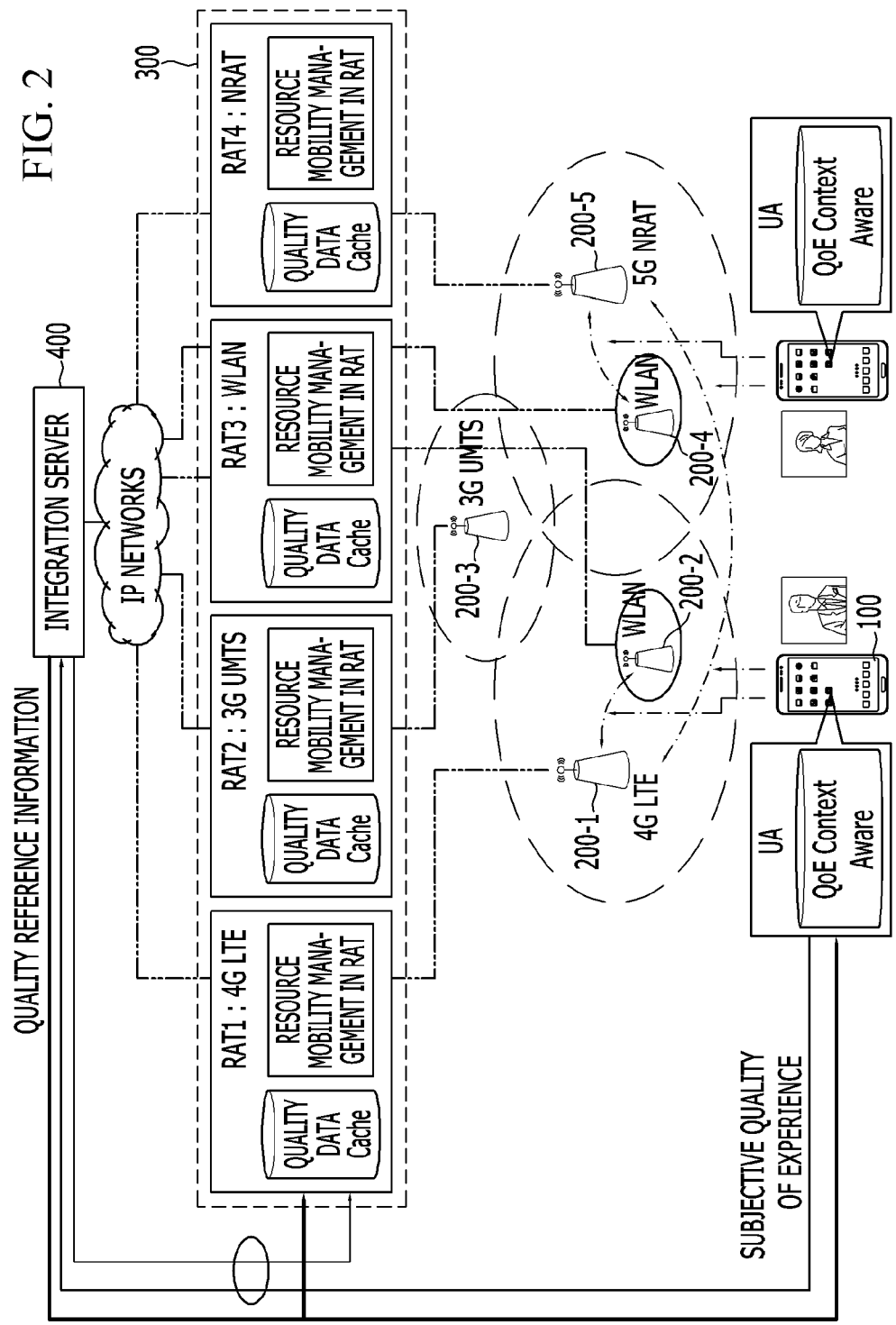
FIG. 2 is an illustrative diagram showing an environment according to an exemplary embodiment of the present invention.

FIG. 2 is an illustrative diagram showing an environment according to an exemplary embodiment of the present invention.

As illustrated in FIG. 2, the environment according to an exemplary embodiment of the present invention that provides a service using the subjective quality information includes a terminal 100, one or more base stations (e.g., RAT, 4G LTE, 3G UMTS, WLAN, or New Radio Access Technology (NRAT)) 300 having heterogeneous wireless access schemes, radio units (RUs) 201-1 to 200-5 connected to the base station 300, and an integration server 400 that performs a control function. The respective RUs 200-1 to 200-5 are connected to the base station 300 and the base station 300 is connected to the integration server 400 via a network. Although the exemplary embodiment of the present invention describes a case in which the base station 300 and the RUs 200-1 to 200-5 are separated from each other by way of example, the RUs 200-1 to 200-5 may also be included in the base station 300.

First, the terminal 100 obtains objective quality information on an accessible base station and wireless section around the terminal from information generated from the base station 300 in which the terminal is located and the terminal itself. In this case, as the objective quality information on the wireless section, received power, data throughput, delay, and packet loss rate may be used, and as the information on the terminal, information such as remaining battery amount may be obtained. The information on the terminal is not received from the base station 300, but may be obtained from the terminal itself.

The above-mentioned objective quality information is converted into subjective quality information (e.g., mean opinion score (MOS)) using a converting model of the objective quality of service and the subjective quality of experience. Although the conversion into the subjective quality information is not illustrated in FIG. 2, it may be performed by the terminal 100 or the integration server 400. However, the exemplary embodiment of the present describes a case in which the terminal performs the conversion function, by way of example.

As such, the quality information around the terminal obtained by the terminal 100 is transmitted to the integration server 400 and is stored in a quality database under control of the integration server 400 at the same time. In addition, the quality information collected by the terminal 100 is transmitted to the base stations having various radio access technologies, that is, various base stations 300, so as to be stored in quality data caches. Through the above-mentioned processes, the subjective quality information of the user is distributed to devices requiring data utilization.

Here, according to an exemplary embodiment of the present invention, although FIG. 2 illustrates a case in which the base station 300 and the RUs 200-1 to 200-5 are separately configured, the base station 300 and the RUs 200-1 to 200-5 may also be illustrated in the same configuration. That is, the exemplary embodiment of the present invention describes and illustrates only the base station 300 in a detailed description, but the present invention is not necessarily limited thereto.

The integration server 400 stores and manages the quality information received from the terminal 100 and controls one or more RUs 200-1 to 200-5, various base stations 300, and the terminal 100 that are interworked with the integration server 400. In addition, the integration server 400 selects an optimal base station for the terminal 100 based on the received quality information and transmits information on the selected base station to the terminal 100, such that the terminal 100 performs communication by interworking with the corresponding base station.

By the above-mentioned function, the integration server 400 is also referred to as a wireless resource selection system. Other than this, the integration server 400 may perform a function of a server which is generally known, and a detail description thereof will be omitted in the exemplary embodiment of the present invention.

A structure of the terminal 100 in the above-mentioned environment will be described with reference to FIG. 3.

Figure 3:
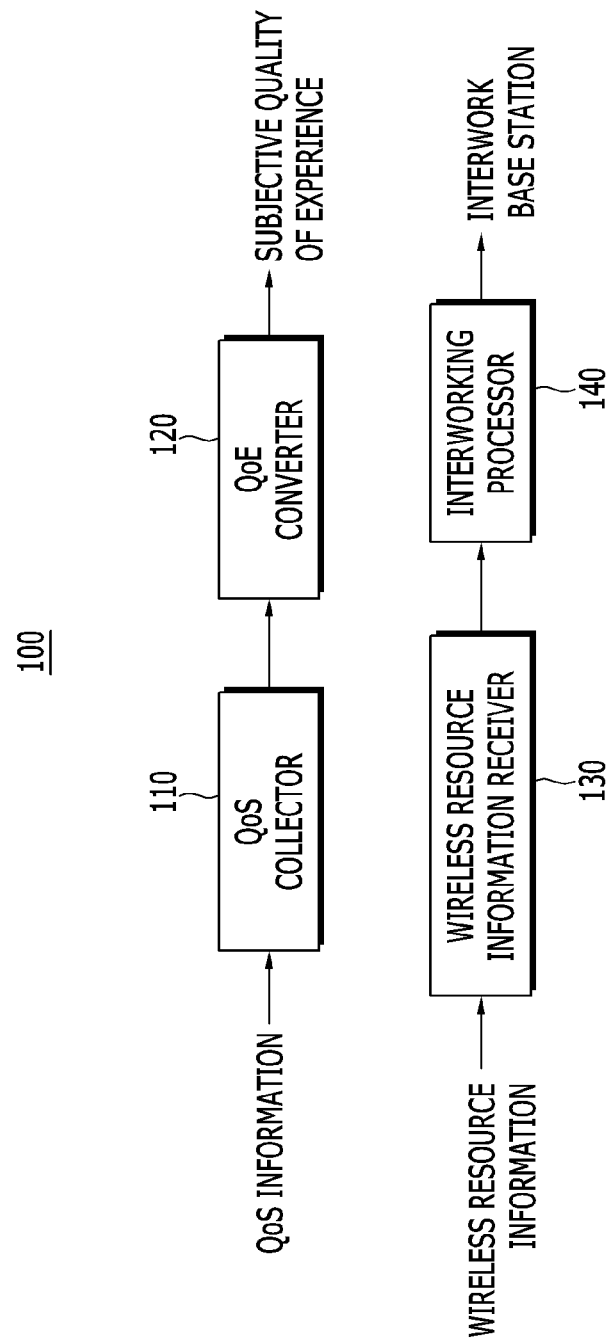
FIG. 3 is a structural diagram of a terminal according to an exemplary embodiment of the present invention.

FIG. 3 is a structural diagram of a terminal according to an exemplary embodiment of the present invention.

As illustrated in FIG. 3, the terminal 100 includes a QoS collector 110, a QoE converter 120, a wireless resource information receiver 130, and an interworking processor 140.

The QoS collector 110 receives QoS information through the RUs 200-1 to 200-5 from a plurality of base stations 300 which are in proximity of a location of the terminal 100. The QoS information means the objective quality information on the accessible base station and wireless section around the terminal. In this case, as the objective quality information on the wireless section, received power, data throughput, delay, and packet loss rate may be used.

In addition, as the information on the terminal, information such as remaining battery amount may be obtained. The information on the terminal is not received from the base station 300, but may be obtained from the terminal itself. Since the contents thereof are already known, a detailed description of a method of collecting the information on the terminal will be omitted in the exemplary embodiment of the present invention.

The QoE converter 120 converts the QoS information collected by the QoS collector 110 into QoE information. That is, the QoE converter 120 collects the objective quality information of the wireless section and generates the subjective quality of experience including unique quality information (remaining battery amount or the like) of the terminal. In addition, the generated subjective quality of experience is transmitted to the integration server 400. Since a method for converting the QoS information into the QoE information, that is, the subjective quality of experience, may be performed by various methods, it is not limited any one method in the exemplary embodiment of the present invention.

The wireless resource information receiver 130 receives information on the wireless resource selected by the integration server 400, that is, base station information, using the subjective quality of experience generated by the terminal 100 and the quality reference information stored in the integration server 400. The wireless resource information, which is the base station information, includes identification information, location information, and the like of the base station which is optimized for the terminal 100.

The interworking processor 140 performs interworking with the corresponding base station selected by the integration server 400, based on the wireless resource information received by the wireless resource information receiver 130. Since a method for interworking with the base station is already known contents, a detail description thereof will be omitted in the exemplary embodiment of the present invention.

Next, a structure of the integration server 400, that is, a system for selecting a wireless resource, will be described with reference to FIG. 4.

Figure 4:
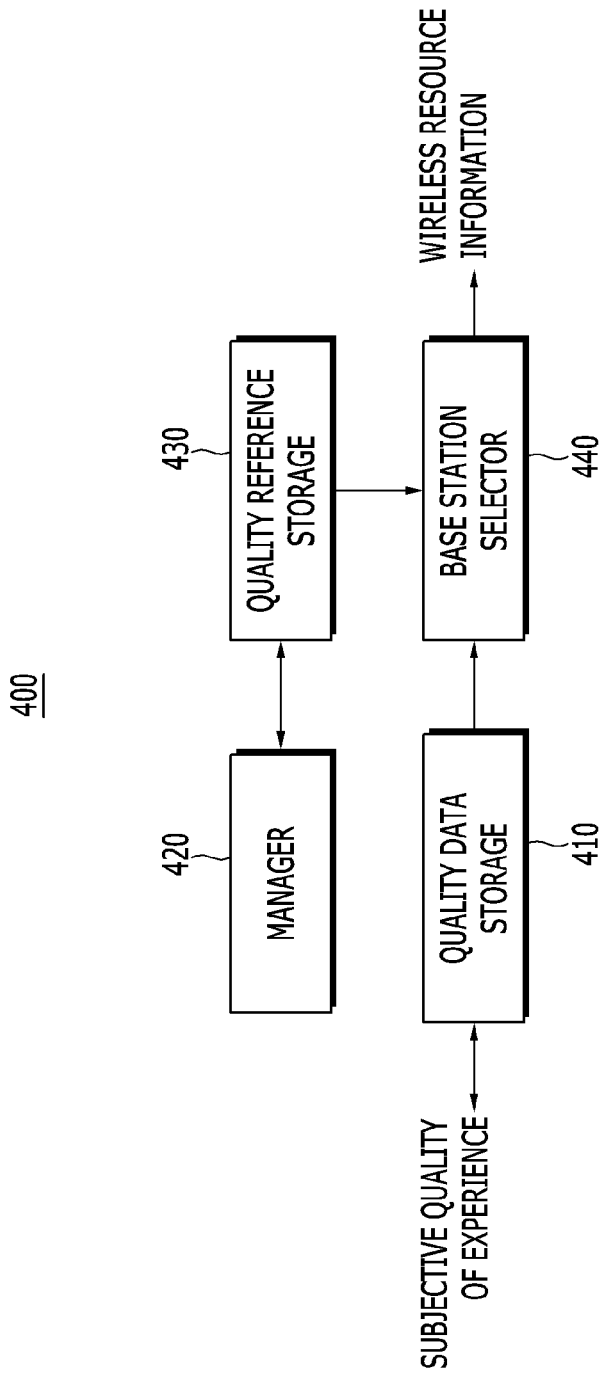
FIG. 4 is a structural diagram of a system for selecting a wireless resource according to an exemplary embodiment of the present invention.

FIG. 4 is a structural diagram of a system for selecting a wireless resource according to an exemplary embodiment of the present invention.

As illustrated in FIG. 4, the system for selecting the wireless resource includes a quality data storage 410, a manager 420, a quality reference storage 430, and a base station selector 440.

The manager 420 stores and manages the base station information (e.g., identification information, wireless resource information, location information, and the like) in order to manage the plurality of base stations 300 that are interworked with the integration server 400.

The quality reference storage 430 is interworked with the manager 420 and stores quality reference information. The stored quality reference information is provided to the terminal 100, the base station, or the station selector 440 to be described below. Thereby, the quality reference information may be used as reference information when the terminal 100 selects an optimal base station among a plurality of neighboring base stations, or the base station selected by the terminal 100 performs communication with the terminal 100 using the optimal wireless resource.

Here, the quality reference information, which is a reference according to QoE policy information, indicates a grade of user, service type, a grade for each servicetype, and the like. This follows a grade of user according to costs paid by the user, a grade of quality required according to the service type, a grade of quality according to a price paid for each service type, and the like. Therefore, by using the collected subjective quality of experience in a specific service required by the user, the base station matched to the required quality reference is selected or the wireless resource (frequency, channel, or the like) within the base station is effectively allocated.

The quality data storage 410 stores and manages the subjective quality of experience received from the terminal 100. In addition, the quality data storage 410 transmits the stored subjective quality of experience to the base stations 300 so as to allow the corresponding base stations 300 to also store and manage the subjective quality of experience.

Since the base station 300 may collect the QoS information, but it is difficult to collect QoE information optimized for the base station 300 among QoE information generated by the terminal 100 based on the QoS, the base station 300 allocates the wireless resource with reference to the subjective quality of experience when allocating the wireless resource in the case in which the terminal 100 is interworked with the base station itself in the future, based on the subjective quality of experience received from the integration server 400. Since a method for allocating the wireless resource based on the subjective quality of experience by the base station 300 may be performed by various methods, a detail description thereof will be omitted in the exemplary embodiment of the present invention.

The base station selector 440 selects a base station optimized for the corresponding terminal 100 based on the subjective quality of experience received by the quality data storage 410 and the quality reference information stored in the quality reference storage 430. In addition, the base station selector 440 transmits information on the selected base station, that is, wireless resource information, to the terminal 100. Since a method for selecting the base station optimized for the terminal 100 based on the subjective quality of experience and the quality reference information by the base station selector 440 may be performed by various methods, a detailed description thereof will be omitted in the exemplary embodiment of the present invention.

In the environment described above, a method for selecting a base station to be interworked with the terminal 100, that is, the wireless resource, based on the subjective quality of experience by the integration server 400 will be described with reference to FIG. 5.

Figure 5:
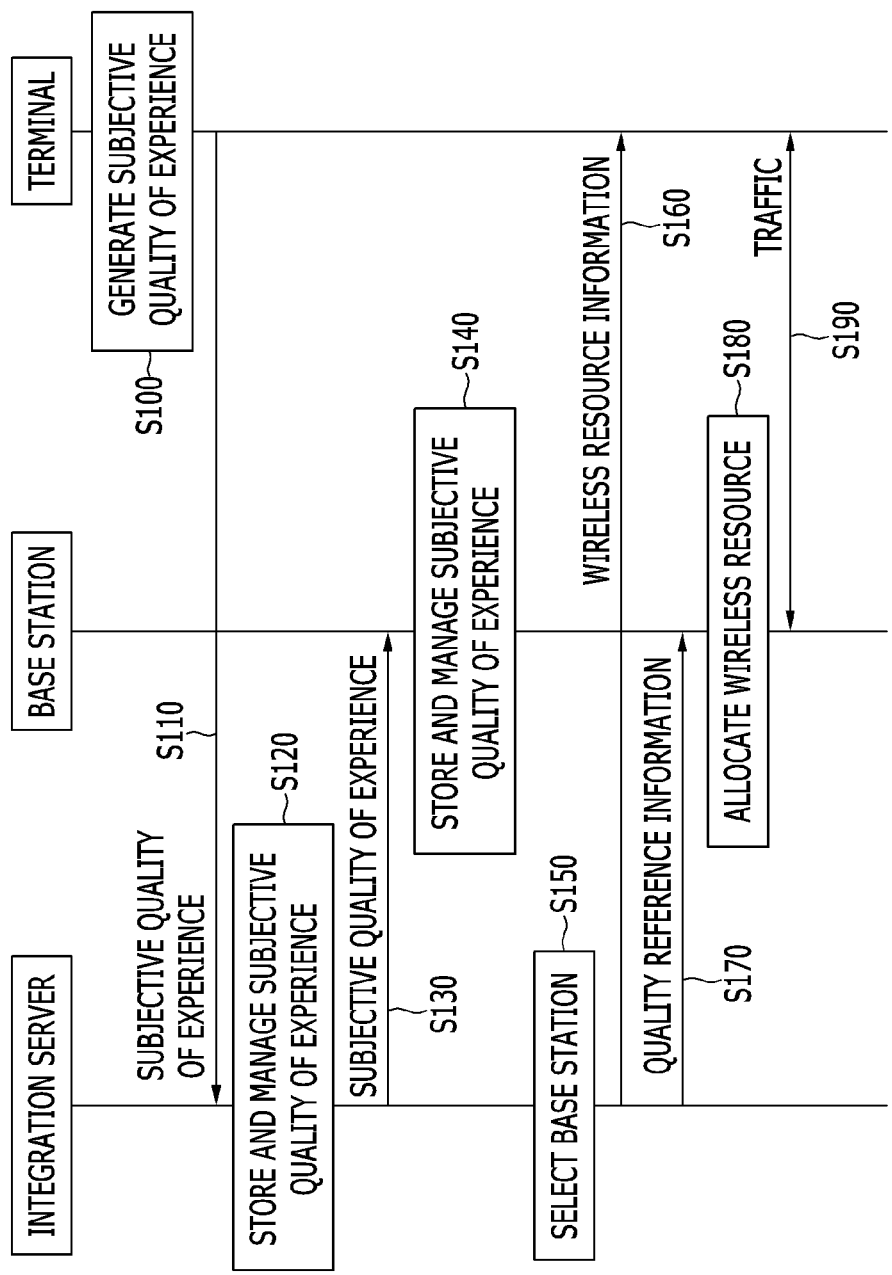
FIG. 5 is a flowchart of a method for selecting a wireless resource according to an exemplary embodiment of the present invention.

FIG. 5 is a flowchart of a method for selecting a wireless resource according to an exemplary embodiment of the present invention.

As illustrated in FIG. 5, the QoS collector 110 of the terminal 100 receives the QoS, which is the objective quality information, on the accessible base station and wireless section around the terminal, from one or more base stations which are in proximity to a region in which the terminal is located. In addition, the QoS collector 110 also collects terminal information such as remaining battery amount in the terminal.

The QoE converter 120 generates the subjective quality of experience using the QoS and the terminal information, which are the objective quality information collected by the QoS collector 110 (S100). Since a method for converting the QoS and the terminal information into the subjective quality of experience in S100 may be performed by various methods, a detailed description thereof will be omitted in the exemplary embodiment of the present invention.

The subjective quality of experience generated in S100 is transmitted to the integration server 400 (S110), and the quality data storage 410 of the integration server 400 stores and manages the subjective quality of experience transmitted from the terminal 100 in S120. The subjective quality of experience stored as described above is transmitted to the respective base stations (S130) and is used as reference information when the wireless resource is allocated to the terminal 100 in the future, based on the subjective quality of experience that is collected by the respective base stations with difficulty (S140).

The base station selector 440 of the integration server 400 selects an optimal base station among the plurality of base stations that are in proximity to the corresponding terminal 100 as the wireless resource for communication, based on the quality reference information which is pre-stored in the quality reference storage 430 and the subjective quality of experience received from the terminal 100 in S110 (S150). In addition, the base station selector 440 transmits the wireless resource information on the selected base station to the terminal 100 (S160) and transmits the quality reference information to the corresponding base station (S170).

The base station allocates the wireless resource to the terminal 100 based on the subjective quality of experience received in S130 and the quality reference information received in S170 (S180). At the same time, if the terminal 100 is interworked with the base station based on the wireless resource information received in S160, communication traffic is transmitted and received between the terminal 100 and the base station (S190). Here, the base station may include a fifth generation base station using wireless RAN, an access point (AP), and a new radio access technology (NRAT), as well as base stations of third and fourth generations.

That is, the integration server 400 receiving the subjective quality information generated from the terminal 100 stores the subjective quality information on the terminal 100 in the quality data storage 410. In addition, the integration server 400 selects a base station that provides an optimal subjective quality among the base stations accessible by the terminal 100, using the stored subjective quality information, and provides information so that the terminal 100 may be interworked with the selected base station.

In addition, the respective base stations allocate the wireless resource so as to satisfy quality that is subjectively experienced by the user, based on the subjective quality of experience generated by the terminal 100 and the quality reference information stored in the integration server 400.

By the above-mentioned processes, the base station that optimally satisfies the quality of experience of the user using the subjective quality information generated by the terminal 100 may be selected, and the corresponding base station may enable communication between the terminal 100 and the base station using the optimal wireless resource, so as to satisfy the quality of experience.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for selecting any one of one or more base stations by a system for selecting a wireless resource that is interworked with a terminal and one or more base stations, the method comprising:
   receiving subjective quality of experience from the terminal, wherein the subjective quality of experience is generated by the terminal based on terminal information and quality of service (QoS) information, which is objective quality information of a wireless section, wherein the terminal information includes remaining battery amount information;
   selecting a base station for the terminal based on the received subjective quality of experience and pre-stored quality reference information;
   and transmitting information for the selected base station as wireless resource information to the terminal,
   wherein the quality reference information is transmitted to the base station and the base station is selected from among the one or more base stations based on the quality reference information which is pre-stored in a quality reference storage,
   wherein the base station allocates the wireless resource to the terminal based on the subjective quality of experience transmitted from an integration server to the base station and the quality reference information transmitted from the integration server to the base station.

2. The method of claim 1, wherein the receiving of the subjective quality of experience includes:
   storing the received subjective quality of experience; and
   transmitting the received subjective quality of experience to one or more base stations.

3. The method of claim 1, wherein the transmitting of the wireless resource information to the terminal includes transmitting the quality reference information to the selected base station so as to be used as reference information together with the subjective quality of experience when the wireless resource for the terminal is allocated.

4. The method of claim 1, further comprising:
   before the receiving, from the terminal, of the subjective quality of experience,
   receiving, by the terminal, the QoS information, which is the objective quality information, from one or more base stations;
   collecting, by the terminal, the terminal information; and
   generating the subjective quality of experience using the received QoS information and the terminal information.

5. The method of claim 4, wherein the Q08 information includes one or more of information of received power, data throughput, delay, and packet loss rate.

6. The method of claim 1, wherein the wireless resource information includes identification information of the selected base station and location information of the selected base station.

* * * * *